(12) United States Patent
Declerck et al.

(10) Patent No.: US 7,558,680 B2
(45) Date of Patent: Jul. 7, 2009

(54) CHARACTERISATION OF PROGRESSIVE SYSTEM DYSFUNCTION

(75) Inventors: Jerome Marie Joseph Declerck, Oxford (GB); Thomas George Wright, Oxford (GB); Robert Ainsley Mclaughlin, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 843 days.

(21) Appl. No.: 10/921,473

(22) Filed: Aug. 19, 2004

(65) Prior Publication Data

US 2005/0065734 A1 Mar. 24, 2005

(30) Foreign Application Priority Data

Sep. 18, 2003 (GB) ................. 0321901.1

(51) Int. Cl.
*G01N 33/00* (2006.01)
*G01N 33/50* (2006.01)
(52) U.S. Cl. .............. 702/19; 702/128; 702/189; 600/300; 600/425; 382/128
(58) Field of Classification Search .......... 702/19, 702/128, 136, 179, 189; 600/590, 587, 414, 600/425; 382/128; 348/425.2
See application file for complete search history.

(56) References Cited

U.S. PATENT DOCUMENTS 5,191,895 A 3/1993 Koltringer 6,402,707 B1 * 6/2002 Ernst ..................... 600/590
6,560,354 B1 * 5/2003 Maurer et al. ............ 382/131
7,031,843 B1 * 4/2006 Bullard et al. ............ 702/19

FOREIGN PATENT DOCUMENTS

| EP | 0 336 443 A1 | 10/1989 |
| EP | 0 632 353 A1 | 1/1995 |
| WO | WO 97/31568 | 9/1997 |

OTHER PUBLICATIONS

Lokkengaard, A., Werdelin, L. M., Friberg, L. "Clinical impact of diagnostic SPET investigations with a dopamine re-uptake ligand", Euro. J. Nuclear Medicine vol. 29, No. 12, Dec. 2002.

* cited by examiner

*Primary Examiner*—Edward Raymond
*Assistant Examiner*—Elias Desta
(74) *Attorney, Agent, or Firm*—William D. Schmidt; Kalow & Springut LLP

(57) ABSTRACT

Methods and systems of measuring progressive multilateral dysfunction of a system are provided. Methods of measuring progressive multilateral dysfunction of a system include, obtaining a plurality of different health measures for the system, defining a multidimensional space with one dimension corresponding to each health measures and defining a point in the multidimensional space representing the values of the health measures. Further the method includes, comparing the position of the defined point to a predefined trajectory through said multidimensional space representing progressive multilateral dysfunction of the system where the measure of the progressive multilateral dysfunction of the system is calculated from the position of the point relative to the predefined trajectory.

27 Claims, 9 Drawing Sheets

Fig.1(a).
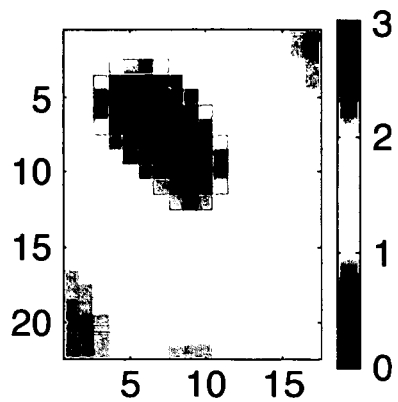
Fig.1(b).
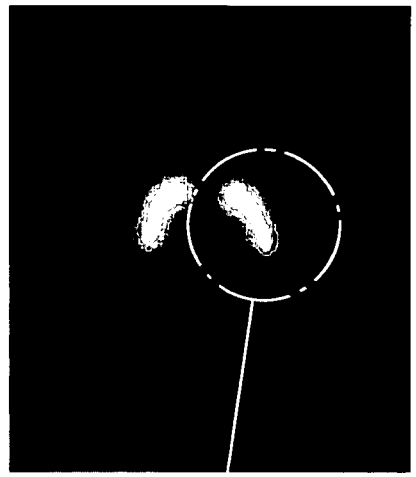
Fig.1(a).
Fig.1(c).
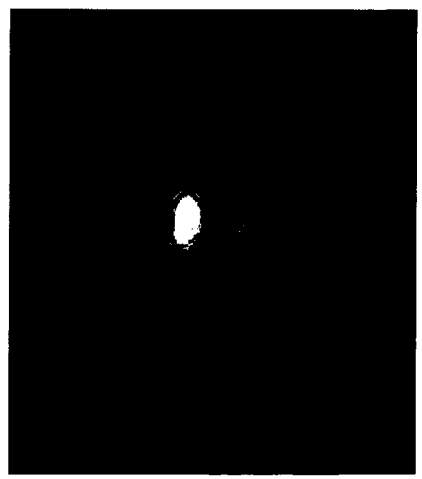

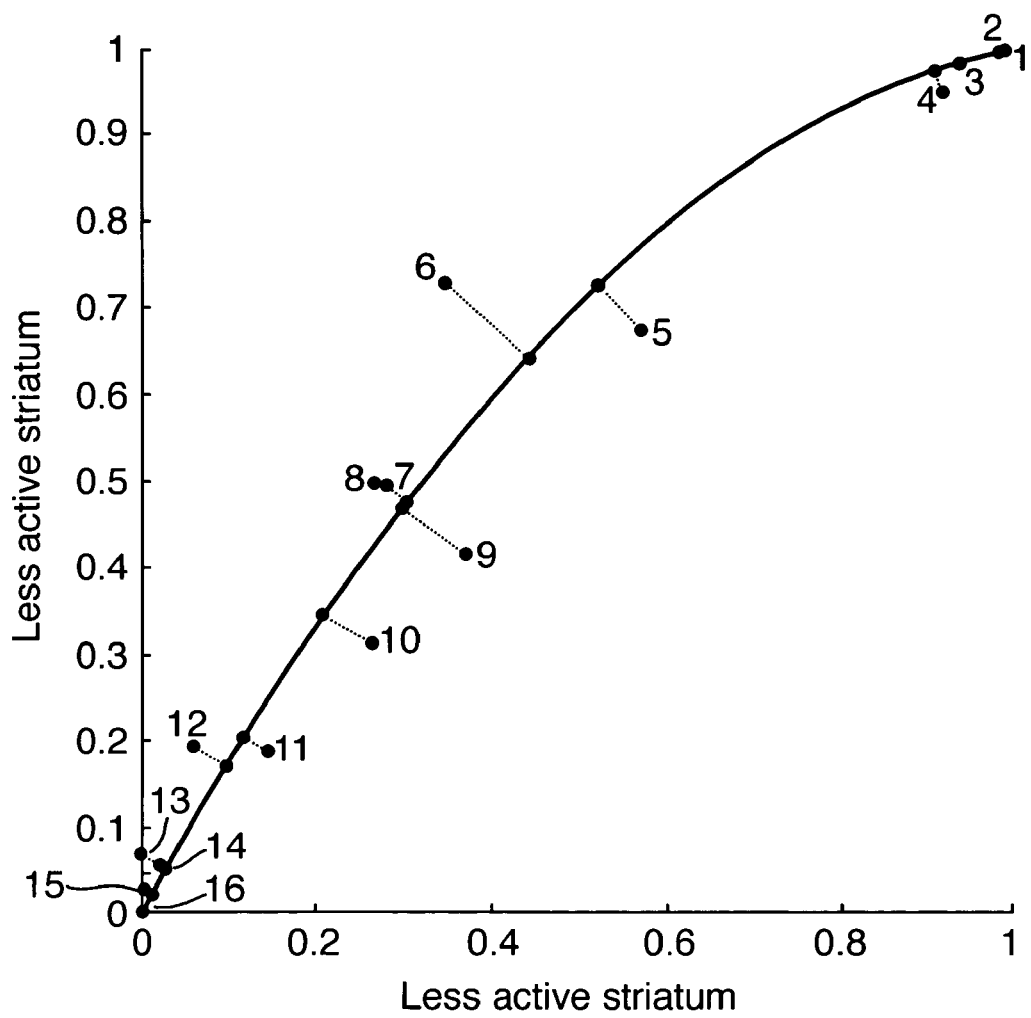

FIGURE 9

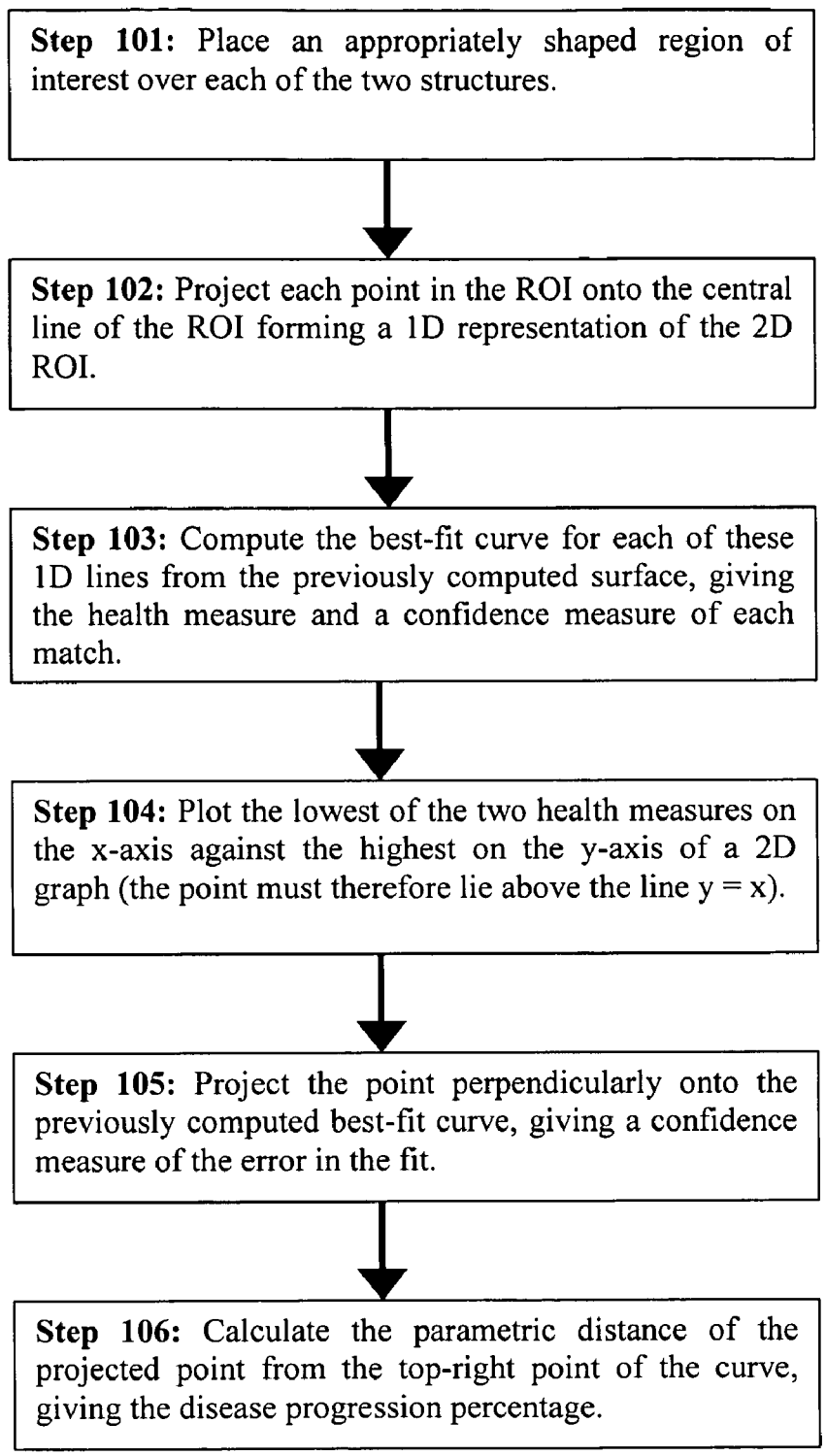

Step 101: Place an appropriately shaped region of interest over each of the two structures.

Step 102: Project each point in the ROI onto the central line of the ROI forming a 1D representation of the 2D ROI.

Step 103: Compute the best-fit curve for each of these 1D lines from the previously computed surface, giving the health measure and a confidence measure of each match.

Step 104: Plot the lowest of the two health measures on the x-axis against the highest on the y-axis of a 2D graph (the point must therefore lie above the line $y = x$).

Step 105: Project the point perpendicularly onto the previously computed best-fit curve, giving a confidence measure of the error in the fit.

Step 106: Calculate the parametric distance of the projected point from the top-right point of the curve, giving the disease progression percentage.

FIGURE 10

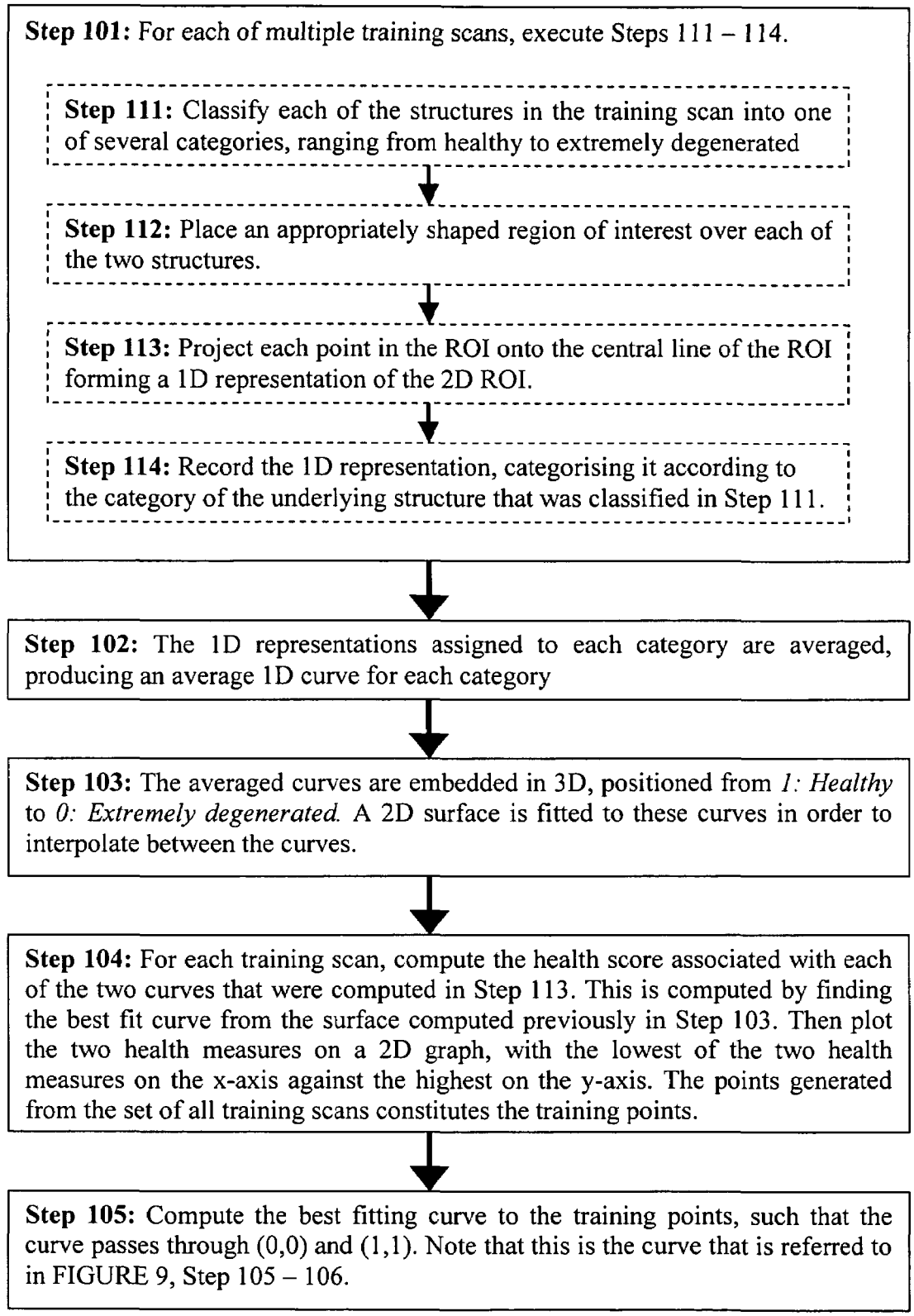

Step 101: For each of multiple training scans, execute Steps 111 – 114.

Step 111: Classify each of the structures in the training scan into one of several categories, ranging from healthy to extremely degenerated

Step 112: Place an appropriately shaped region of interest over each of the two structures.

Step 113: Project each point in the ROI onto the central line of the ROI forming a 1D representation of the 2D ROI.

Step 114: Record the 1D representation, categorising it according to the category of the underlying structure that was classified in Step 111.

Step 102: The 1D representations assigned to each category are averaged, producing an average 1D curve for each category

Step 103: The averaged curves are embedded in 3D, positioned from *1: Healthy* to *0: Extremely degenerated*. A 2D surface is fitted to these curves in order to interpolate between the curves.

Step 104: For each training scan, compute the health score associated with each of the two curves that were computed in Step 113. This is computed by finding the best fit curve from the surface computed previously in Step 103. Then plot the two health measures on a 2D graph, with the lowest of the two health measures on the x-axis against the highest on the y-axis. The points generated from the set of all training scans constitutes the training points.

Step 105: Compute the best fitting curve to the training points, such that the curve passes through (0,0) and (1,1). Note that this is the curve that is referred to in FIGURE 9, Step 105 – 106.

CHARACTERISATION OF PROGRESSIVE SYSTEM DYSFUNCTION

TECHNICAL FIELD

The present invention relates to the characterisation, i.e. monitoring and/or measurement of progressive dysfunction of a system. More particularly the invention relates to a method, which may be embodied in software for a software-controlled machine, for characterising such progressive dysfunction.

BACKGROUND OF THE INVENTION

There are many fields in which systems are subject to progressive, or gradually changing (usually increasing), dysfunction. In the medical or veterinary field, for example, the human or animal body, or more particularly certain parts of it, may be subject to gradual deterioration as a result of disease or aging. Non-biological systems, such as mechanical, electrical or electronic systems, are also usually subject to gradual deterioration, again through aging or wear or the gradually changing (usually increasing) accumulation of faults. It is desirable to be able to monitor and quantify such progressive dysfunction. However, it can be difficult to do this in a consistent and quantitative way. This is particularly true in the case of multilateral dysfunction, i.e. dysfunction which arises in several different parts of the system. Techniques are available for detecting such multilateral dysfunction, but the consistent and quantitative characterisation of such dysfunction is problematic.

A medical example can be used to demonstrate the problems. Parkinson's disease is a disorder of the central nervous system that affects between one and one-and-a-half million U.S. citizens. Parkinson's disease can appear at any age, but it is uncommon in people younger than 30, and the risk of developing it increases with age. It occurs in all parts of the world, and men are affected slightly more often than women. Patients with the disease suffer severe motor-neuro symptoms, including shaking, rigidity, slowness of movement and poor balance.

The progression of Parkinson's disease can be monitored by nuclear medical imaging of the two striata of the brain (left and right). A characteristic of Parkinson's disease is the lack of dopamine in the striatum of the brain, caused by the loss of neurons in the substantia nigra. The amount of dopamine in the striatum can be measured by injecting a radioligand (for example ioflupane (FP-CIT/DaTSCAN) or iodobenzamide (IBZM)); after the radioactive labeled molecules arrive at the dopaminergic terminals in the striatum, they bind to pre-synaptic dopamine transporters molecules which enables imaging of functional dopaminergic neurons using Single Photon Emission Computed Tomography (SPECT).

The SPECT image of a normal person shows high uptake in the left and right striatum, as shown in FIGS. 1(a) and (b) of the accompanying drawings. These images are SPECT images with $^{123}$I tracer (here DaTSCAN) showing the striatum as "hotspots". FIG. 1(a) is a close-up of one of the striata in FIG. 1(b). In the case of Parkinson's disease, the number of dopamine transporters in the striatum is substantially reduced. The SPECT image of a typical Parkinson's disease patient shows reduced uptake in the striatum, and in some patients there is asymmetry in the level of uptake between the left and right striatum. Such an image is shown in FIG. 1(c) of the accompanying drawings.

FIGS. 2(a), (b) and (c) show typical disease progression for a single striatum. As the disease progresses, the tail of the striatum, the putamen, dies off first, followed finally by the upper region, the caudate. FIG. 2(a) shows a healthy striatum, progressing in FIG. 2(b) to a moderately degenerated one where the putamen tail has very reduced uptake, and finally in FIG. 2(c) an extremely degenerated striatum with little uptake at all in either putamen or caudate.

Existing techniques for analysing these SPECT images involve independent measures of the amount of uptake in the left and right striata, with a possible additional calculation to indicate the degree of asymmetry. For example, one way of measuring the degree of dysfunction has been proposed in which a standard fixed-size rectangle is placed over each striatum in the image, and uptake in each rectangle computed by summing intensities. Uptake ratios are computed for the left and right striatum, and a measure of asymmetry is produced.

A. Lokkegaard, L. M. Werdelin and L. Friberg proposed a similar technique in "Clinical Impact of Diagnostic SPECT Investigations with a Dopamine Re-Uptake Ligand", European J. Nuclear Medicine, Vol. 29, No. 12, December 2002. In this proposal a standard fixed-size shape is used to divide the striatum into two parts, the caudate and putamen. Uptake in each part is computed separately by summing intensities of pixels within each region. These quantities are then used to compute uptake ratios.

However in both of these techniques it is difficult to relate the result to the state of progression of the disease and it is difficult to know what level of confidence there is in the result. Furthermore, the summing of intensities over the whole or a large part of the striatum, while a deliberate simplification, loses the information in the distribution of the uptake across the striatum.

Similar bilateral or multilateral dysfunctions occur in other medical conditions such as osteoarthritis in the knees, lung performance (for example in smoker's lungs) or the build-up of neurocapillary tangles in the brain of Alzheimer's disease sufferers. Similarly, multilateral system dysfunction occurs in non-biological systems, such as complex machines, or collections of machines, for example in a factory setting. Thus techniques allowing better characterisation of such progressive multilateral dysfunction, for example in better indicating the degree of progression of the dysfunction and in giving an indication of confidence in the measurement, would be useful.

SUMMARY OF THE INVENTION

The present invention provides a way of indicating progression of multilateral system dysfunction by comparing a measurement of system dysfunction with a predefined pattern of progressive dysfunction for such a system. The predefined pattern may be obtained from an analysis of such systems, for example a number of measurements on similar systems which form a training set. The invention allows the production of a single measurement indicating the degree of progression of system dysfunction, and also the comparison with the pattern allows the production of a confidence measure.

In the case of multilateral, such as bilateral, dysfunction, the invention provides for the characterisation of dysfunction progression by comparing the "healthier" of the measurements from the system against the "sicker" of the measurements from the system.

In more detail one aspect of the present invention provides a method of measuring progressive multilateral dysfunction of a system, comprising
obtaining a plurality of different health measures for the system;

defining a multidimensional space with one dimension corresponding to each health measures;

defining a point in the multidimensional space representing the values of the health measures for the system;

comparing the position of the defined point to a predefined trajectory through said multidimensional space representing progressive multilateral dysfunction of the system; and wherein the measure of the progressive multilateral dysfunction of the system is obtained from the position of the point relative to the predefined trajectory.

The position of the defined point may be compared to the trajectory by projecting the point, e.g. normally, onto the trajectory and calculating the distance of the projected point along the trajectory. A level of confidence in the measure may be calculated from the distance of the defined point from the predefined trajectory.

The predefined trajectory may represent an expected progression of the multilateral dysfunction of the system, and can be based, for instance, on the measured progression of multilateral dysfunction in a plurality of systems similar to the system under analysis. Statistical analysis of the measurement data from such systems can be used to define the trajectory, such data forming a data set for the analysis.

The position of the point compared to the predefined trajectory may be expressed as a percentage of the distance along the trajectory from a first end of the trajectory representing a healthy system to a second end of the trajectory defined as representing completely progressed dysfunction.

The different health measures may be measures of the state of health of a plurality of sub-systems of the system. For example in the case of disease of the body the sub-systems could be the left and right knees or lungs, the left and right striata in the brain, or parts of the heart or other organs. In a mechanical system the different health measures could be measurements of the performance of sub-systems of the machine, or in a collection of machines measurements of the performance of individuals in the collection. Where the measurements are of sub-systems, the state of health is preferably measured in the same way for each one. Alternatively, the different health measures could be different health measurements on the same system or sub-system.

In the specific example given later a first health measure is the uptake of imaging agent in the sicker of the striata of the brain and the second is the uptake in the healthier of the striata. The first is plotted on one axis of the space and the second on another. Thus in general the dimensions of the space may be assigned to the different health measures in an order based on the value of the health measure, e.g. from that representing the healthiest to that representing the sickest. For example, in the case of bilateral dysfunction of the brain, where the space can be defined by two orthogonal x and y axis, the measurements from the left-hand side of the brain are not always plotted on, say, the x axis with the measurements from the right-hand side on the y axis; instead, the healthier measurement is always plotted on one axis, say the x axis, and the sicker on the y axis. The same principal applies to multilateral dysfunction with correspondingly higher dimensional spaces. The advantage of this is that disease progression is represented by a single trajectory regardless of whether it is the left or right of the striata which is the sicker. Clearly, in applications where it is significant which sub-system is which, the axis can be assigned to the sub-system rather than in order of the health measure values.

A second aspect of the invention provides a method of quantifying the state of health of a human or animal by reference to a property thereof which progressively changes with time, comprising the steps of:

measuring the value of the property;

comparing the measured value of the property with a set comprising a plurality of values of the property derived from measurements displaying different degrees of said progressive change; and calculating as said quantified state of health the degree of progression represented by said measured value.

The set of values may be obtained by a method comprising categorising the values in the set into a plurality of different categories of degree of progression, and calculating a typical, e.g. an average, of each category from the members of that category. The obtained typical values may be interpolated, for example by representing them in a parameter space with degree of progression (analogous to time) on one axis and fitting a hyper-surface to them, to form an effectively continuous representation of the progression. The measured value can then be compared to this continuous representation to find the best fit, and thus to judge where on the degree of progression axis the individual measurement fits. Thus the state of the system can be expressed as a distance along a path from an initial state of the spatial variation of the property to a final state of the spatial variation of the property. The property measured could be an image attribute in an image of the system, such as obtained by use of an imaging agent which is taken up by the system, an example of this being medical imaging (of a human or animal) as discussed above.

Preferably the dimensionality of the spatial variation measurements are reduced by projecting into a spatial representation with reduced dimension. This simplifies computation, though clearly if such simplification is unnecessary, then the dimensionality of the data sets does not need to be reduced.

Both aspects of the invention are applicable to the human or animal body, for example to dysfunction of the brain as discussed above, as well as to other forms of multilateral disease. The invention, however, is also applicable to the assessment of non-human or animal systems, such as collections of machines or complex systems formed from sub-systems.

It will be appreciated that the invention may be embodied in software for executing the method on a conventional computer system. Thus the invention provides also a computer program comprising program code means for so executing the method, and the invention also extends to apparatus for executing the method, such as a software-controlled machine.

BRIEF DESCRIPTION OF THE DRAWINGS

The invention will be further described by way of example with reference to the accompanying drawings in which:—

FIGS. 1(a), (b) and (c) are SPECT images showing the striatum of a human brain in the normal state and with Parkinson's disease;

FIG. 8 illustrates the fitting of a curve to the data sets of FIG. 7;

FIG. 9 is a flow chart illustrating the calculation of the health measures and disease progression in an embodiment of the invention; and FIG. 10 is a flow chart illustrating the use of a training set to calculate the hyper-surface and disease progression curve used in FIG. 9.

DETAILED DESCRIPTION OF EMBODIMENTS OF THE INVENTION

An example of the invention will now be described with reference to characterising the progression of Parkinson's disease from SPECT scans of the striata as described above.

In broad terms this embodiment consists of the following three steps:—

1) Compute a single score, for example a number between 0 and 1, indicating the health of each individual structure (the Heath Measure) of, in this example, the left and right striata.

2) Use the two health measures to compute a further score, for example a percentage, representing the progression of the disease, where 0% is healthy and 100% is extremely degenerated (this may be termed the Disease Progression Percentage).

3) Compute confidence intervals indicating how confident the algorithm is in the estimation.

Thus in the case of charactering Parkinson's disease a health measure is first computed for each striatum. The values of the health measure range from 1 to 0 where 1 indicates a healthy striatum and 0 indicates the most severe reduction in the level of uptake of the contrast agent. Although 1 and 0 are chosen in this example, obviously the range can be normalised between other values. These health measures, for the left and right striata, are then used to describe the disease progression. As Parkinson's disease progresses these two values will decrease in a characteristic way. This allows the calculation of the disease percentage.

Turning first to the computation of the health measure for each striatum, the first aim is to characterise the level of uptake of the contrast agent at different points in the striatum. Given a conventional 3-D SPECT data set (which may, for example, consist of 128 axial slices), first the slices which include the striatum are found. In a typical data set the striatum is found in the 10 slices between slices 10 and 20. The slices including the striatum can be found manually by a clinician inspecting the slices, or alternatively can be found automatically by finding the brightest part of the SPECT scans (which is located in the striatum) and taking a predefined number of slices above and below that slice. The search area can be reduced, for example, by detecting the head outline and concentrating the search in the quadrant of the head where the striatum is known to be located.

Having selected a number of layers including the striatum, a single 2-D analysis slab is created by summing the layers together and normalising all the intensity values within the slab by dividing each pixel by an average background intensity value. This defines a very thick SPECT slice which includes all (or most) of the striatum. Normalisation is effective to ensure that factors such as variations in the amount of contrast agent given to the patient, total scan time or time between administering the contrast agent and performing the scan do not affect the overall brightness of the scan, thus confusing the analysis.

Figure 2A:
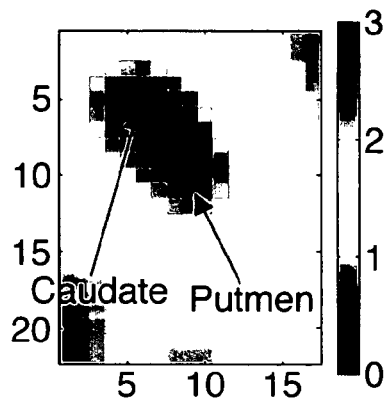
FIGS. 2(a), (b) and (c) are enlarged SPECT images showing the disease progression of Parkinson's disease in a human brain.
Figure 2B:
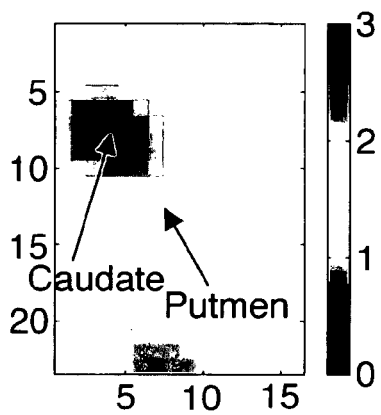
Figure 2C:
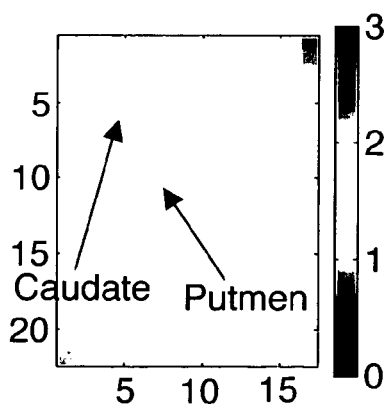
Figure 3A:
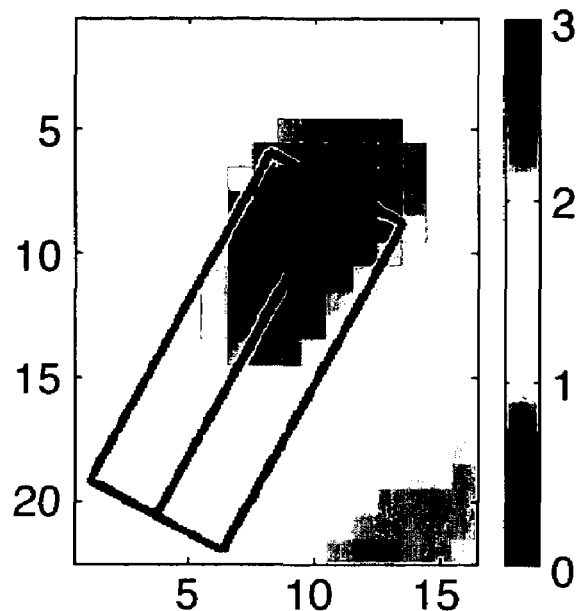
FIG. 3 illustrates steps in an embodiment of the invention with reference to a SPECT scan of the human brain.

Having normalised the intensity values in the thick slice, a Region of Interest (ROI) is positioned over the striatum such that the centre line of this ROI lies close to the central part of the striatum. This is shown in FIG. 3(a). In FIG. 3(a) a rectangular ROI is used, though ROIs of other shape, for exampled based on the expected shape of the striatum, can be used. In this example the Region of Interest is positioned by locating a short edge of the rectangle at the brightest part of the striatum (this may be located by positioning a larger search area over the striatum and searching for the brightest region within it) and orienting the long axis of the rectangle along the striatum. (The ROI may be positioned differently as long as the position can be consistently found in the image).

Figure 3B:
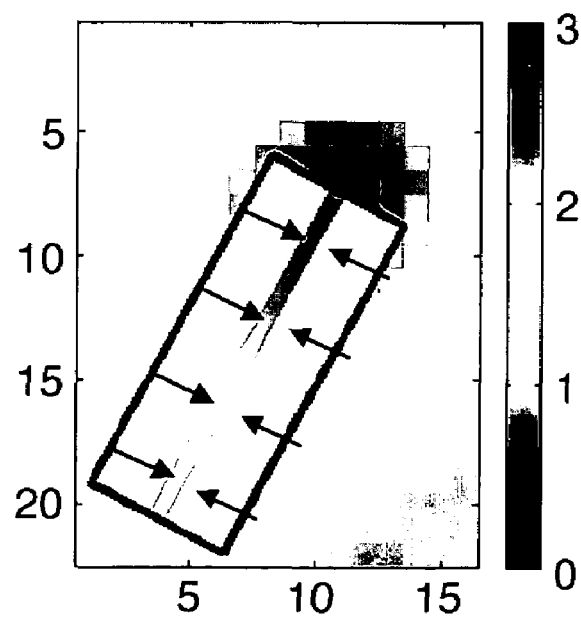
Figure 4A:
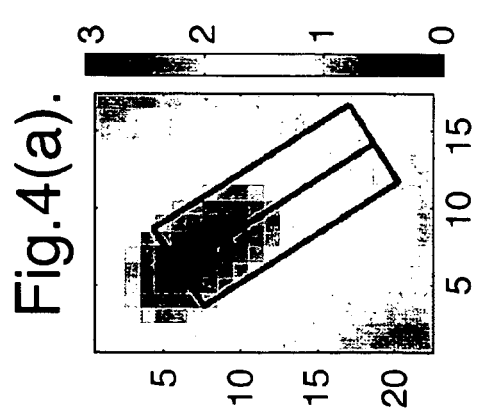
FIGS. 4(a) to (f) illustrate further steps in an embodiment of the invention, again with respect to SPECT scans of the human brain.
Figure 4B:
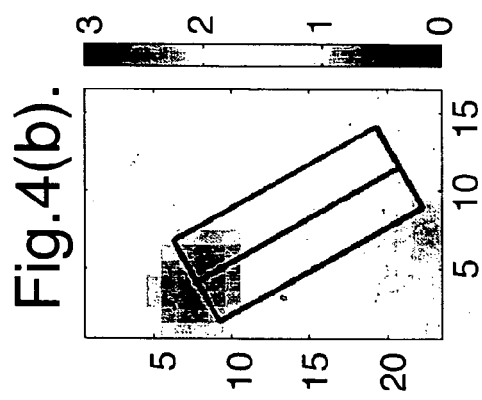
Figure 4C:
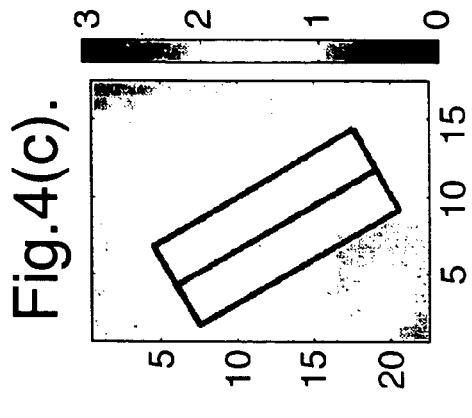
Figure 4D:
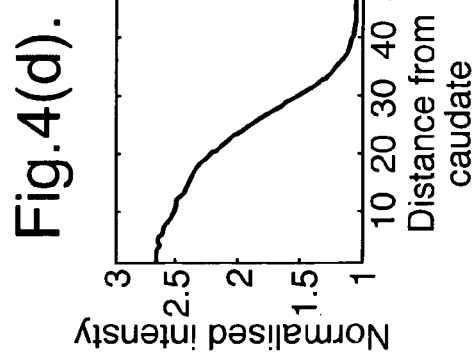
Figure 4E:
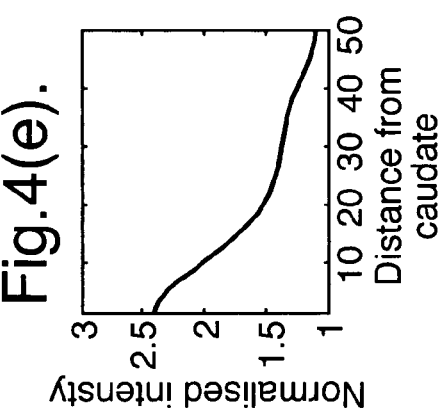
Figure 4F:
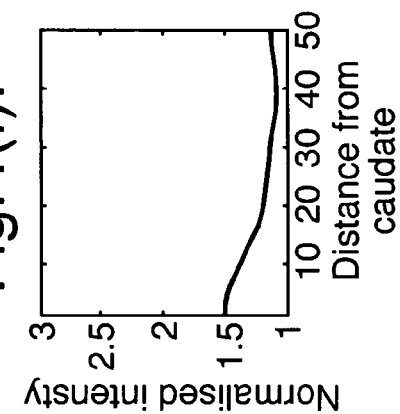

Next, as illustrated schematically in FIG. 3(b), each point in the region of interest is projected onto a line defined through the region of interest (for example the centre line of the rectangle) by summing the intensity values (representing uptake of the contrast agent) over the width of the region of interest. This reduces noise and provides a one-dimensional representation of the uptake along the long axis of the striatum. This summed uptake value is graphed along the length of the striatum and FIGS. 4(a) to (c) illustrate three examples of regions of interest over SPECT scans with FIGS. 4(d) to (f) illustrating the corresponding summed values of intensity. The graphs begin at the short edge of the ROI which is positioned on the brightest point of the striatum and extend along the striatum towards the end of the putamen. FIG. 4(a) shows a SPECT scan for a healthy striatum and FIG. 4(d) the corresponding graphed intensity along the length of the striatum. FIGS. 4(b) and (e) show corresponding values for a striatum with a moderate to severe degeneration, and FIGS. 4(c) and (f) show values for a striatum with extreme degeneration. It can be seen that the values decrease into the putamen which is believed to be a characteristic of Parkinson's disease—the putamen dies off more quickly than the caudate. As the disease progresses the graph for a particular striatum gradually changes from a healthy graph in FIG. 4(d) through the graph in FIG. 4(e) to the extreme degeneration of FIG. 4(f). Thus the position of a graph along this progression from FIG. 4(d) to FIG. 4(f) is indicative of the health of the striatum and can be used to calculate a health measure. This is achieved in a quantitative way as described below.

A collection of test scans is taken which show different stages in the progression of the disease from healthy to extreme degeneration. Each scan includes two striata (the left and right) and each of the striata can be classified into one of five stages:—

Stage 1: Healthy
Stage 2: Mild degeneration
Stage 3: Moderate degeneration
Stage 4: Severe degeneration
Stage 5: Extreme degeneration The choice of these five stages is not critical, more or fewer stages can be chosen according to the particular application. These test scans comprise the training set for the algorithm. Classifying each striatum into one of the stages is used to teach the algorithm the different stages in progression of the disease. Thus the algorithm can compute an optimal model to describe the reduction in uptake in the striatum as the disease progresses. For acceptable results a training set containing more than 100 scans should be used.

Figure 5A:
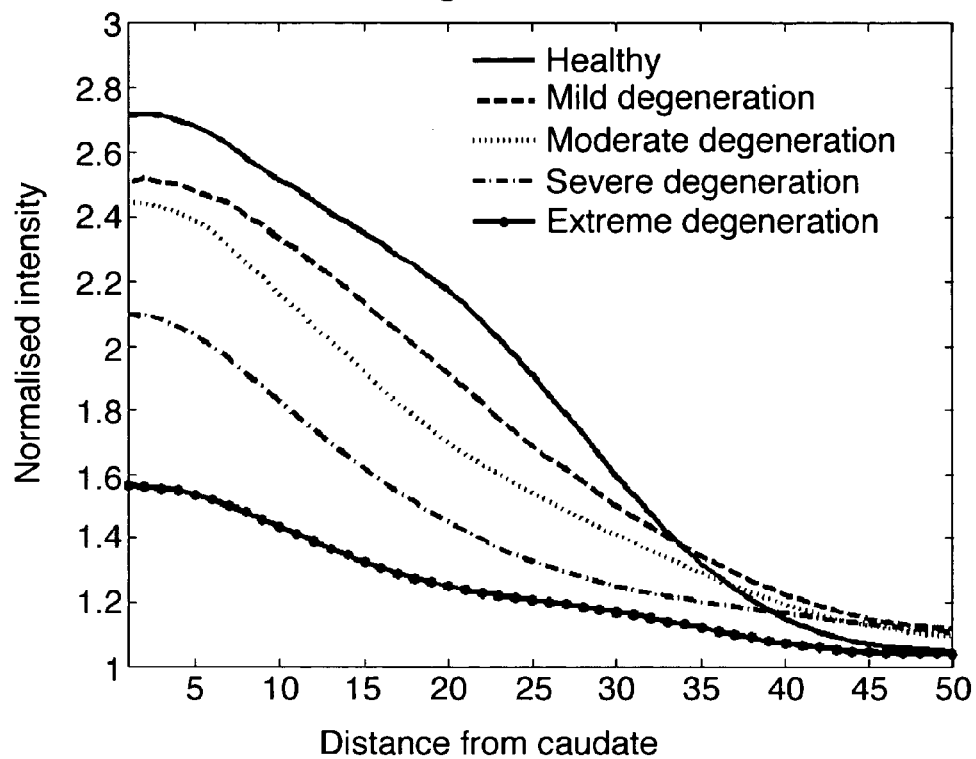
FIGS. 5(a) and (b) illustrate further steps in the embodiment of the invention in which the disease progression is categorised and a surface is fitted to an average to the members of each category.

The training of the algorithm involves taking the graphs which have been classified into the five stages above, and for each of the five stages computing an average graph to typify each stage. A set of five graphs for a typical training set is shown in FIG. 5(a). The solid graph of Stage 1: Healthy shows a gradual decrease in uptake along the striatum. Stages 2 and 3 each show a progressive decrease in uptake along the putamen. Stage 4: Severe degeneration shows deterioration in the putamen and also some deterioration in the caudate. Finally, Stage 5: Extreme degeneration displays a marked drop in uptake in the caudate.

Figure 5B:
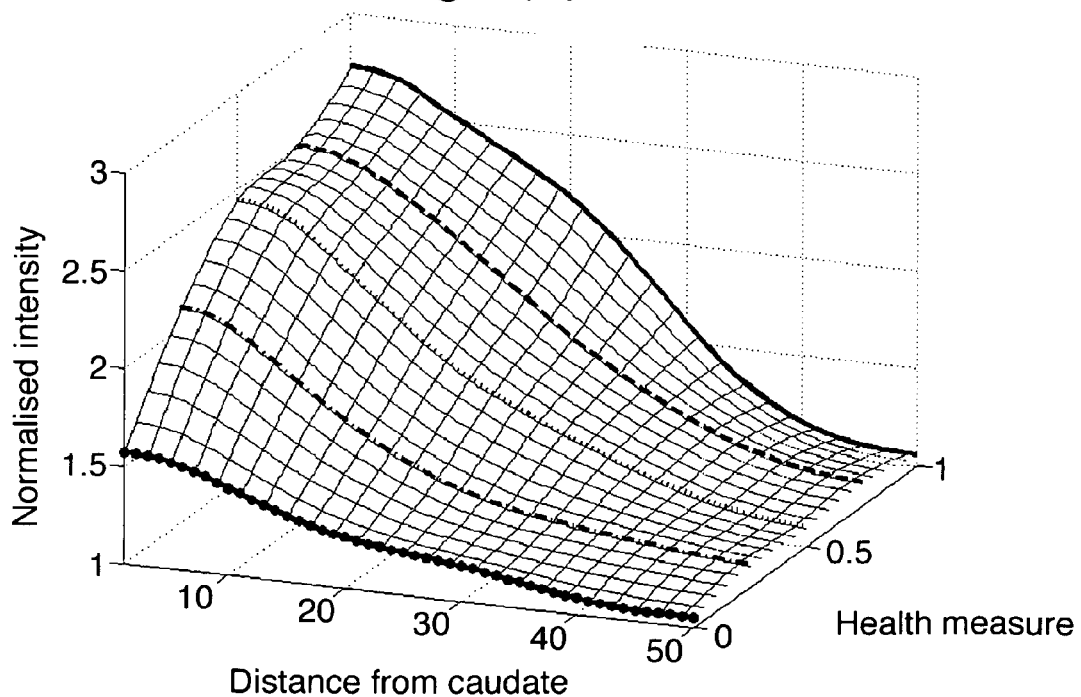

It is important to note that the aim of this embodiment is not simply to classify a new striatum into one of these five stages. To accurately quantify progression, a health measure between 0 and 1 is to be computed, indicating where the striatum lies on the continuum between Stage 1: Healthy and Stage 5: Extreme degeneration. This is done by embedding the five graphs in a 3-dimensional space, where the third dimension is the health measure. The graphs are positioned between health measures of 0 and 1 on the basis of experience of what degree of progression a given category represents. One such positioning would be to position Stage 1: Healthy=health measure 1.0, Stage 2=health measure 0.75, Stage 3=0.5, Stage 4=0.25 and Stage 5: Extreme degeneration=0.0. The embedding of the five graphs into a 3-dimensional space is shown in FIG. 5(b) and then a surface, for example a cubic spline surface is fitted over the graphs. This fills in the gaps to provide an effectively continuous representation of the progression from healthy to extremely degenerated.

Having formed this representation, it is possible then to compare a given new scan requiring assessment to this representation by computing the uptake graph for the striatum and finding its best fit to the surface in FIG. 5(b). For example the position having the smallest least-squares error can be selected, though different error measures can also be used. The appropriate health measure between 0 and 1 can then be read off.

A confidence value for the health measure can also be obtained from the error between the uptake graph for the particular striatum under consideration and the most similar graph in the continuum of graphs defined by the surface in FIG. 5(b). A small error implies a high confidence in the measure. Thus this confidence value can be used to warn the clinician when an accurate measurement is not possible, for example due to artefacts in the imaging process.

Thus by using the steps above, for a given patient a value between 0 and 1 for a health measure for each of the left and right striata can be obtained. This measure is useful because it is quantitative, and also it is consistent in that it is judged by a reference to the progression in many other data sets forming the training set. Thus it gives a consistent and quantitative measurement of the state of the striata for that patient.

Figure 6:
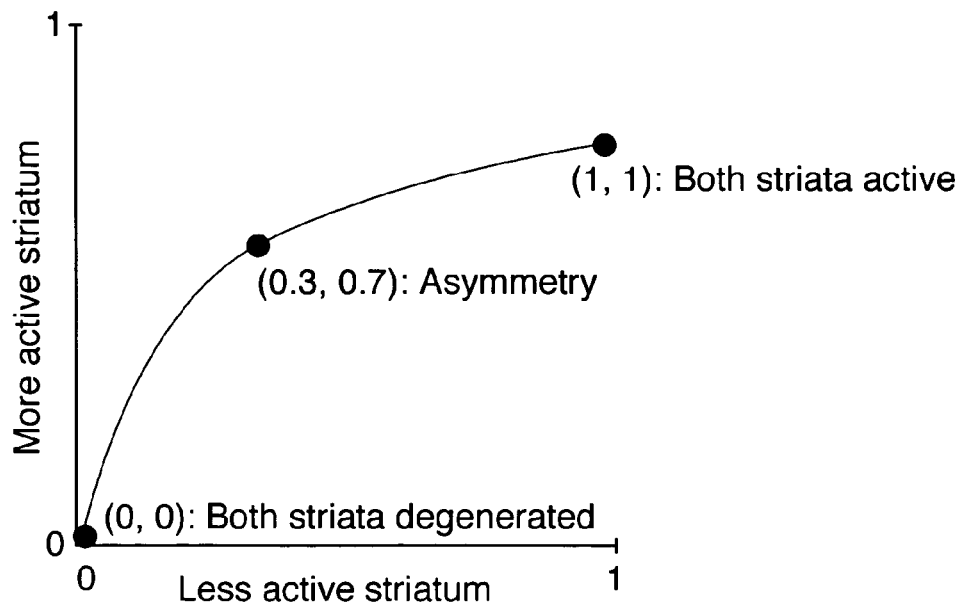
FIG. 6 illustrates a further step in an embodiment of the invention in which the health measures of left and right striata are plotted against each other.

These health measures can be used as described below to assess the level of disease progression for the patient. As indicated in the introduction, the left and right striata do not necessarily degenerate at the same rate and the asymmetry can be indicative of the degree of progression of the disease. To obtain a quantitative and consistent assessment of the state of progression of the disease, in this embodiment the health measures for the left and right striata are plotted as a single point on a graph as is illustrated in FIG. 6, where the horizontal co-ordinate is given by the less active (sicker) striatum and the vertical co-ordinate is given by the more active (healthier) striatum, as illustrated below. A point in the top right-hand corner of this graph (1, 1) indicates that both striata are healthy. A point in the bottom left-hand corner (0, 0) indicates that both striata are extremely degenerated. A value of (0.3, 0.7) indicates severe degeneration in one striatum and mild degeneration in the other.

Figure 7:
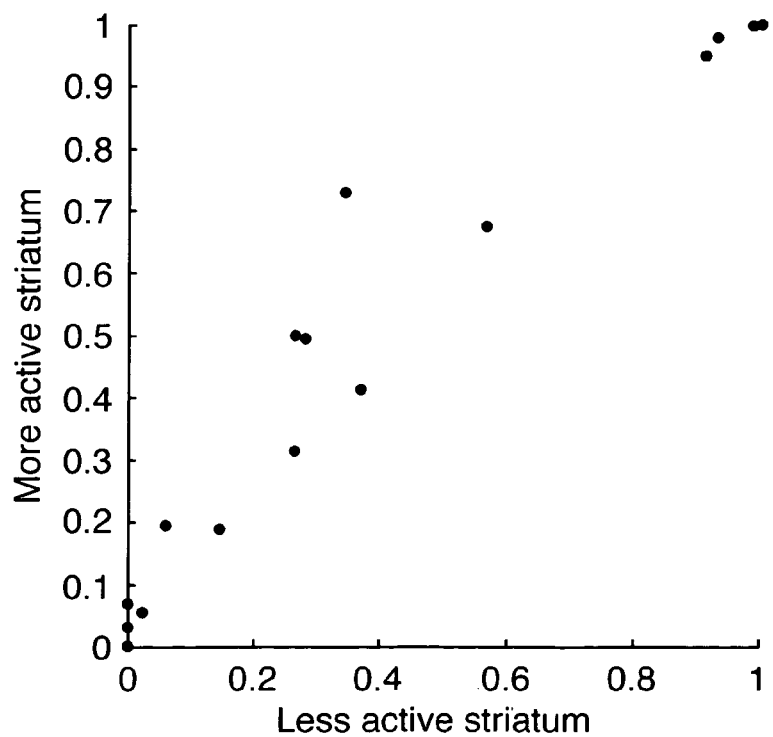
FIG. 7 is a graph illustrating the health scores from sixteen scans of the striata.

In order to obtain a curve representing an expected trajectory through this 2-D space, a database of test-cases covering all stages of the disease is taken. In FIG. 7 the health measure for both striata is plotted using a database of 16 cases, with the more active striatum being plotted against the less active striatum. Note that since the more active structure is plotted on the y-axis, no points will lie below the line y=x.

The distribution of points is clearly clustered along a curve. To estimate this curve, a quadratic is fitted to this data, minimising the sum of the normal distances from the data to the curve, as shown below in FIG. 8. This curve indicates the path of disease progression. Note that the choice of using a quadratic fit was determined to be best for the particular application of Parkinson's disease, but any curve could be used instead as appropriate. Also other criteria for fitting the curve could be used, for example least-squares, modified least-squares or weighted least-squares etc. By projecting a given point corresponding to the health measures for the striata of a scan being analysed onto the curve (such a projection may be linear or non-linear) and measuring its parametric distance along the curve, the disease progression is quantified. This can be termed the disease progression percentage, where 0% corresponds to (1, 1), Healthy, and 100% corresponds to (0, 0), Extreme degeneration.

The perpendicular distance between the curve and any point gives a second confidence measure of how well the model fits this particular data—for large-distances, the algorithm is less confident of the disease progression.

Given sufficient quantities of data, a probability density function (PDF) can be estimated, and from this PDF the distance can be computed between a point and the corresponding point on the curve. The likelihood assigned to a particular point can be used to calculate a confidence measure associated with the point.

Thus this disease progression percentage is a single score which indicates the progression of the bilateral disease (in this case Parkinson's disease) and is associated with a confidence measure.

FIG. 9 illustrates in summary how a given scan is analysed to produce the two health measures and then the disease progression percentage and associated confidence values once the algorithm has already been set up with training data to compute the spline surface (shown in FIG. 5(b)) and best-fit curve on the progression graph (shown in FIG. 8).

Firstly, the health measures of the two regions must be computed:

Step 101. Place an appropriately shaped region of interest over each of the two structures.

Step 102. Project each point in the ROI onto the central line of the ROI forming a 1D representation of the 2D ROI.

Step 103. Compute the best-fit curve for each of these 1D lines from the previously computed spline surface, giving the health measure and a confidence measure of each match.

Once this is done, the disease progression is computed:

Step 104. Plot the lowest of the two health measures on the x-axis against the highest on the y-axis of a 2D graph (the point must therefore lie above the line y=x).

Step 105. Project the point perpendicularly onto the previously computed best-fit curve, giving a confidence measure of the error in the fit.

Step 106. Calculate the parametric distance of the projected point from the top-right point of the curve, giving the disease progression percentage.

FIG. 10 illustrates the training process mentioned above. Step 101 involves a series of steps in which the structures in a set of training scans are classified in step 111 into one of the categories mentioned above, and then in steps 112, 113 and 114 the one dimensional representations (such as shown in FIGS. 4(d), (e) and (f)) are calculated for each of the scans, and categorised according to the classification of step 111, thus linking the qualitative and quantitative assessments. In step 102 the one dimensional representations are averaged in each category and in step 103 these are embedded in 3D positioned in the third dimension from 1: Healthy to 0: Extremely Degenerated and a hyper-surface is fitted to the curves to interpolate between them as shown in FIG. 5(b). In step 104 the best fit of each individual training scan to the surface is found and the health measure between 0 and 1 is read off. The two health measures are then plotted against each other (as shown in FIG. 7) and in step 105 the best fitting curve is found which passes through (0,0) and (1,1). This curve is then used for assessing disease progression as in steps 105-106 of FIG. 9.

What is claimed is:

1. A method of measuring progressive multilateral dysfunction of a system, comprising
   obtaining a plurality of different health measures for the system;
   defining a multidimensional space with one dimension corresponding to each health measures;
   defining a point in the multidimensional space representing the values of the health measures;
   comparing the position of the defined point to a predefined trajectory through said multidimensional space representing progressive multilateral dysfunction of the system; and
   wherein the measure of the progressive multilateral dysfunction of the system is calculated from the position of the point relative to the predefined trajectory.

2. A method according to claim 1 wherein the position of the point is compared to the trajectory by projecting the defined point onto the trajectory and calculating the distance of the projected point along the trajectory.

3. A method according to claim 2 wherein the point is projected normally onto the predefined trajectory.

4. A method according to claim 1 wherein a level of confidence in the measure of the progressive multilateral dysfunction of the system is calculated from the distance of the defined point from the predefined trajectory.

5. A method according to claim 1 wherein the predefined trajectory represents an expected progression of said multilateral dysfunction of the system.

6. A method according to claim 5 wherein the predefined trajectory is based on the measured progression of multilateral dysfunction of a plurality of systems similar to said system.

7. A method according to claim 6 wherein the predefined trajectory is obtained by statistical analysis of the measured progression of multilateral dysfunction of said plurality of systems which thereby form a training set for the analysis.

8. A method according to claim 1 wherein the position of the point compared to the predefined trajectory is expressed as a percentage of the distance along the trajectory from a first end of the trajectory representing a healthy system to a second end of the trajectory defined as representing completely progressed dysfunction.

9. A method according to claim 1 wherein the dimensions of the space are assigned to the different health measures in a defined order based on the relative values of the health measure.

10. A method according to claim 9 wherein the defined order is from that representing the healthiest to that representing the sickest.

11. A method according to claim 1 wherein the different health measures are measures of the state of health of a plurality of sub-systems of said system.

12. A method according to claim 11 wherein the state of health of each of the plurality of sub-systems is measured in the same way.

13. A method according to claim 1, wherein at least one of the health measures is obtained by quantifying the state of health of a human or animal by reference to a property thereof which progressively changes with time, comprising the steps of:
   measuring the value of the property;
   comparing the measured value of the property with a set comprising a plurality of values of the property derived from measurements displaying different degrees of said progressive change; and
   calculating as said health measure the degree of progression represented by said measured value.

14. A method according to claim 13 wherein the set of values is obtained by a method comprising:
   categorising the measurements displaying different degrees of progression into a plurality of different categories of degree of progression;
   calculating an average value for each category from the members of that category; and
   wherein the measured value is compared with said average value.

15. A method according to claim 14 wherein the method of obtaining the set of values further comprises:
   interpolating the obtained average value to obtain an effectively continuous representation of the progression with which the measured value is compared.

16. A method according to claim 15 wherein the step of interpolating the average value comprises fitting a hyper-surface to said average value represented in a parameter space, said hyper-surface constituting said effectively continuous representation, and said step of comparing the measured value of the property comprises finding the best fit of said measured value to said hyper-surface.

17. A method according to claim 13 wherein the health measure is expressed as a distance along a path from an initial state of said property to a final state of said property.

18. A method according to claim 13 wherein the measured value of the property is at least one of the temporal and spatial variation of the property in the human or animal body.

19. A method according to claim 13 wherein the property is represented by an image attribute in a medical image.

20. A method according to claim 13 wherein the property is the uptake of an imaging agent introduced into the human or animal.

21. A method according to claim 18 wherein dimensionality of said measured value is reduced by projecting and summation into a space with reduced dimensions.

22. A method according to claim 13 wherein the dysfunction is a bilateral disease.

23. A method according to claim 22 wherein the dysfunction is a bilateral disease of the brain.

24. A method according to claim 1 wherein the system is a human.

25. A method according to claim 1 wherein the system is a non-human animal.

26. A computer program comprising program code means for executing on a computer system the method of claim 1.

27. A computer-readable storage medium storing a computer program comprising program code for executing the method of claim 1.

* * * * *